(12) United States Patent
Sciuto et al.

(10) Patent No.: US 8,159,172 B2
(45) Date of Patent: Apr. 17, 2012

(54) METHOD FOR CONTROLLING AN ELECTRIC MOTOR BY USING THE PWM TECHNIQUE

(75) Inventors: Marcello Sciuto, S. Giovanni in Persiceto (IT); Sergio Vigna, Turin (IT); Piero Carbonaro, Turin (IT); Francesco Del Mese, Casalecchio di Reno (IT)

(73) Assignee: Magneti Marelli Powertrain S.p.A., Corbetta (IT)

( * ) Notice: Subject to any disclaimer, the term of this patent is extended or adjusted under 35 U.S.C. 154(b) by 741 days.

(21) Appl. No.: 12/292,791

(22) Filed: Nov. 26, 2008

(65) Prior Publication Data
US 2009/0148138 A1 Jun. 11, 2009

(30) Foreign Application Priority Data
Nov. 28, 2007 (EP) ..................... 07425754

(51) Int. Cl.
*G05B 11/28* (2006.01)
(52) U.S. Cl. ........ 318/599; 318/560; 318/811; 388/811; 388/815; 388/819
(58) Field of Classification Search .................. 318/599, 318/811, 400.01, 400.26, 400.29, 445, 432, 318/434, 560, 721, 799, 437; 388/811, 815, 388/819; 123/399
See application file for complete search history.

(56) References Cited

U.S. PATENT DOCUMENTS

| | | | | |
|---|---|---|---|---|
| 5,699,772 A | * | 12/1997 | Yonekawa et al. | 123/497 |
| 5,818,178 A | * | 10/1998 | Marumoto et al. | 318/400.32 |
| 5,831,403 A | * | 11/1998 | Kanki et al. | 318/286 |
| 6,208,102 B1 | | 3/2001 | Kikuchi et al. | |
| 6,236,199 B1 | | 5/2001 | Irle | |
| 6,661,216 B1 | | 12/2003 | Grant et al. | |
| 6,837,217 B1 | * | 1/2005 | Hoshino et al. | 123/399 |
| 6,976,470 B2 | * | 12/2005 | Hoshino et al. | 123/399 |
| 7,025,040 B2 | * | 4/2006 | Hoshino et al. | 123/399 |

(Continued)

FOREIGN PATENT DOCUMENTS

EP 0793157 9/1997

(Continued)

OTHER PUBLICATIONS

European Search Report mailed Jun. 2, 2008 in European Appln. No. 07425754.4.

*Primary Examiner* — Walter Benson
*Assistant Examiner* — Antony M Paul
(74) *Attorney, Agent, or Firm* — Davidson, Berquist, Jackson & Gowdey, LLP (57) ABSTRACT

A method for controlling an electric motor by using the PWM technique including the steps of: applying to the clamps of the electric motor an electric voltage varying in time, which displays a square waveform and consists of a sequence of pulses having a uniform wave period and a variable width; adjusting the average value of the electric voltage by varying the width of the pulses; determining the overall required width variation; subdividing the overall required width variation in a determined number of partial variations, the overall sum of which is equivalent to the overall required width variation; and gradually varying the width amplitude of the pulses of the electric voltage by applying in a sequence a corresponding partial variation to each pulse, so that the difference between the width amplitude of a pulse and the width of a following pulse is equivalent to the corresponding partial variation.

21 Claims, 5 Drawing Sheets

U.S. PATENT DOCUMENTS

| | | | |
|---|---|---|---|
| 7,240,665 B2 * | 7/2007 | Hoshino et al. | 123/399 |
| 7,308,871 B2 * | 12/2007 | Machida | 123/90.15 |
| 2004/0232864 A1 * | 11/2004 | Sunaga et al. | 318/434 |
| 2005/0185358 A1 * | 8/2005 | Machida et al. | 361/160 |
| 2006/0275970 A1 | 12/2006 | Nadd et al. | |

FOREIGN PATENT DOCUMENTS

| | | |
|---|---|---|
| EP | 1480324 | 11/2004 |
| JP | 06030594 A * | 2/1994 |

* cited by examiner

METHOD FOR CONTROLLING AN ELECTRIC MOTOR BY USING THE PWM TECHNIQUE

TECHNICAL FIELD

The present invention relates to a method for controlling an electric motor by using the PWM technique.

The present invention is advantageously applied to the control of an electric motor of a butterfly valve arranged upstream of an intake manifold of an internal combustion engine, to which the following disclosure will explicitly refer without therefore loosing in generality.

BACKGROUND ART

A butterfly valve, which is arranged upstream of an intake manifold and adjusts the flow rate of the air which is fed to the cylinders, is included in internal combustion engines. A typical currently marketed butterfly valve features a valve body provided with a tubular feeding pipe through which the air taken in by the internal combustion engine flows; a butterfly plate, which is keyed onto a rotating shaft to rotate between an opening position and a closing position of the feeding pipe, is accommodated inside the feeding pipe. The rotation of the butterfly plate is controlled by an actuator device normally including a direct current electric motor coupled to the rotating shaft of the butterfly plate by means of a gear transmission and at least one spring that pushes the rotating shaft of the butterfly plate towards the closing position.

A position sensor, which is adapted to detect the angular position of the rotating shaft (i.e. the butterfly plate), is coupled to the rotating shaft bearing the butterfly plate; in modern butterfly valves the position sensor is of the contactless type, i.e. it includes a rotor integral with the rotating shaft and a stator, which is arranged in a fixed position, faces the rotor and is electromagnetically coupled to the rotor.

The butterfly valve is controlled by an electronic control unit, which is integrated in a PCB (Printed Circuit Board) and controls in feedback the angular position of the butterfly plate by using the signal provided by the position sensor. In particular, the electronic control unit is provided with an electric drive which adjusts the average voltage applied to the electric motor by means of the PWM (Pulse Width Modulation) technique which involves the application of a variable electric voltage having a square waveform to the clamps of the electric motor, and the adjustment of the average value of the voltage by varying the amplitude of the single square voltage pulses. In order to be able to apply both a positive voltage and a negative voltage (required to obtain high precision and speed in the handling of the butterfly plate) to the clamps of the electric motor, the electric drive typically includes an H-bridge or another equivalent electronic circuit that allows the inversion of the output voltage. A capacitor is connected upstream of the H-bridge, the capacitor serving to uniform the voltage absorbed by the electric drive and to allow the circulation of electric current absorbed by the electric motor when a negative voltage is applied to the clamps of the electric motor; indeed, the electronic circuit of the electronic control unit arranged upstream of the H-bridge normally only allows the one-directional circulation of the electric current towards the H-bridge.

In a statistical analysis of the failures that occur in an internal combustion engine, it has been noted that the failure of the capacitor—in particular the dielectric of the capacitor wears through—arranged upstream of the H-bridge of the electric drive controlling the electric motor of the butterfly valve, is relatively frequent. The failure of the capacitor arranged upstream of the H-bridge of the electric drive that controls the electric motor of the butterfly valve is not too detrimental for the butterfly valve, as the control in feedback of the butterfly valve is in any case capable of operating even with deteriorated performances. On the other hand, the failure of the capacitor arranged upstream of the H-bridge of the electric drive is extremely detrimental when the electronic control unit itself also controls the fuel injectors; indeed, the voltage oscillations determined by the lack of the stabilising action by the capacitor rapidly cause the failure of the fuel injectors with a subsequent breakdown of the vehicle and very high repair costs.

The only solution that has currently been suggested to avoid the failure of the capacitor arranged upstream of the H-bridge of the electric drive controlling the electric motor of the butterfly valve is to greatly oversize the capacitor itself; however, such a solution implies very high costs and sizes.

DISCLOSURE OF INVENTION

It is the object of the present invention to provide a method for controlling an electric motor by using the PWM technique, such a method being free from the above described drawbacks and, in particular, being easy and cost-effective to implement.

A method for controlling an electric motor by using the PWM technique according to the attached claims is provided according to the present invention.

BRIEF DESCRIPTION OF THE DRAWINGS

The present invention will now be described with reference to the accompanying drawings, which show a non-limitative embodiment thereof, in which.

PREFERRED EMBODIMENTS OF THE INVENTION

Figure 1:
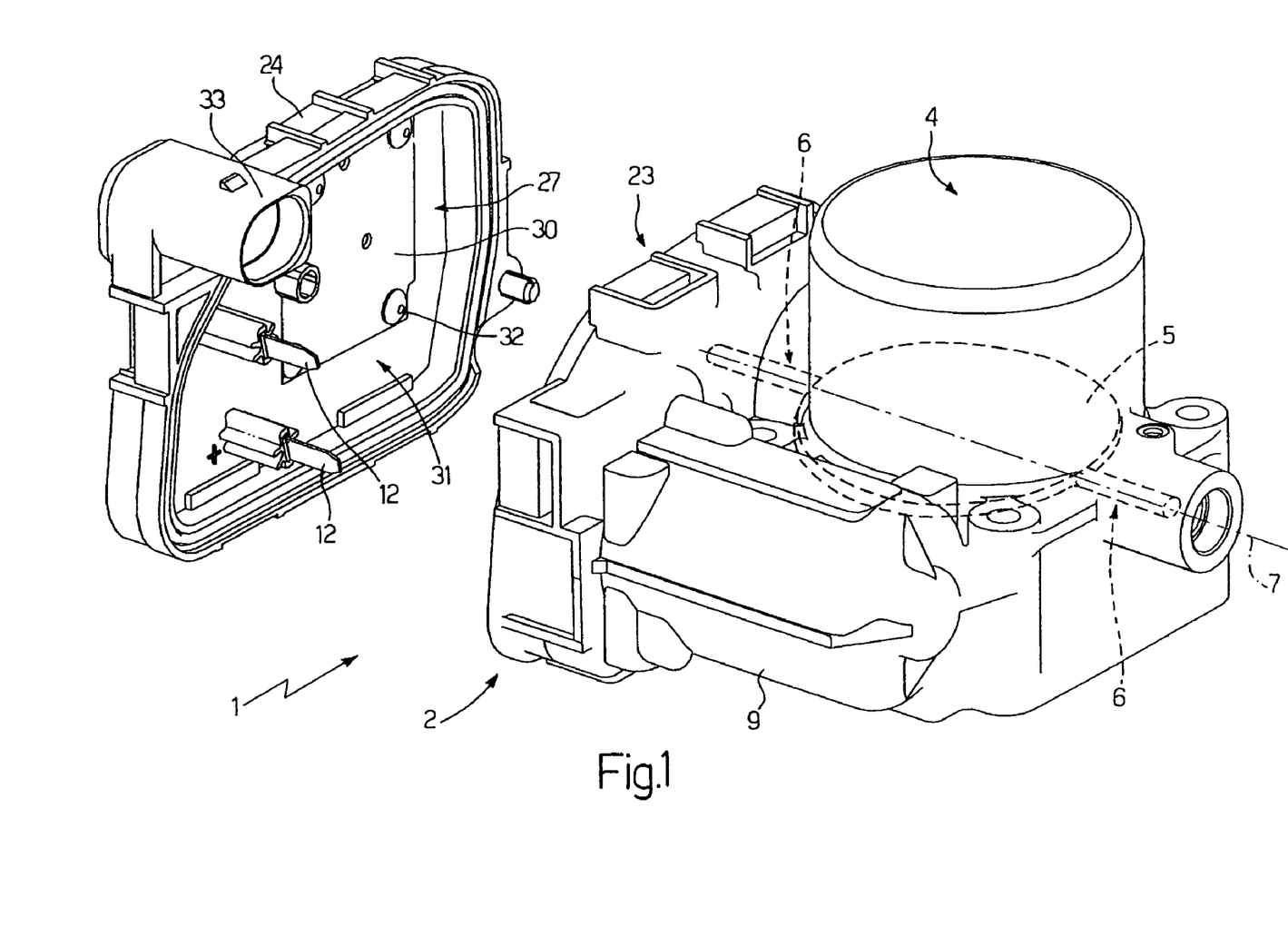
FIG. 1 is a perspective, partially exploded view, with parts removed for clarity, of a butterfly valve provided with a controlled electric motor according to the present invention.

In FIG. 1, numeral 1 indicates as a whole an electronically controlled butterfly valve for an internal combustion engine (not shown). The butterfly valve 1 includes a valve body 2 accommodating an actuator device provided with a direct current electric motor 3 (shown in FIG. 2), a circular section tubular feeding pipe 4 through which the air taken in by the internal combustion engine flows, and a butterfly plate 5 (diagrammatically shown with a broken line), which is circular shaped, engages the feeding pipe 4 and rotates between an opening position and a closing position of the feeding pipe 4 by effect of the action of an actuator device. The butterfly plate 5 is keyed onto a rotating shaft 6 featuring a longitudinal rotation axis 7 to rotate under the control of the actuator device between the opening position and the closing position by the effect of the action of the actuator device.

Figure 2:
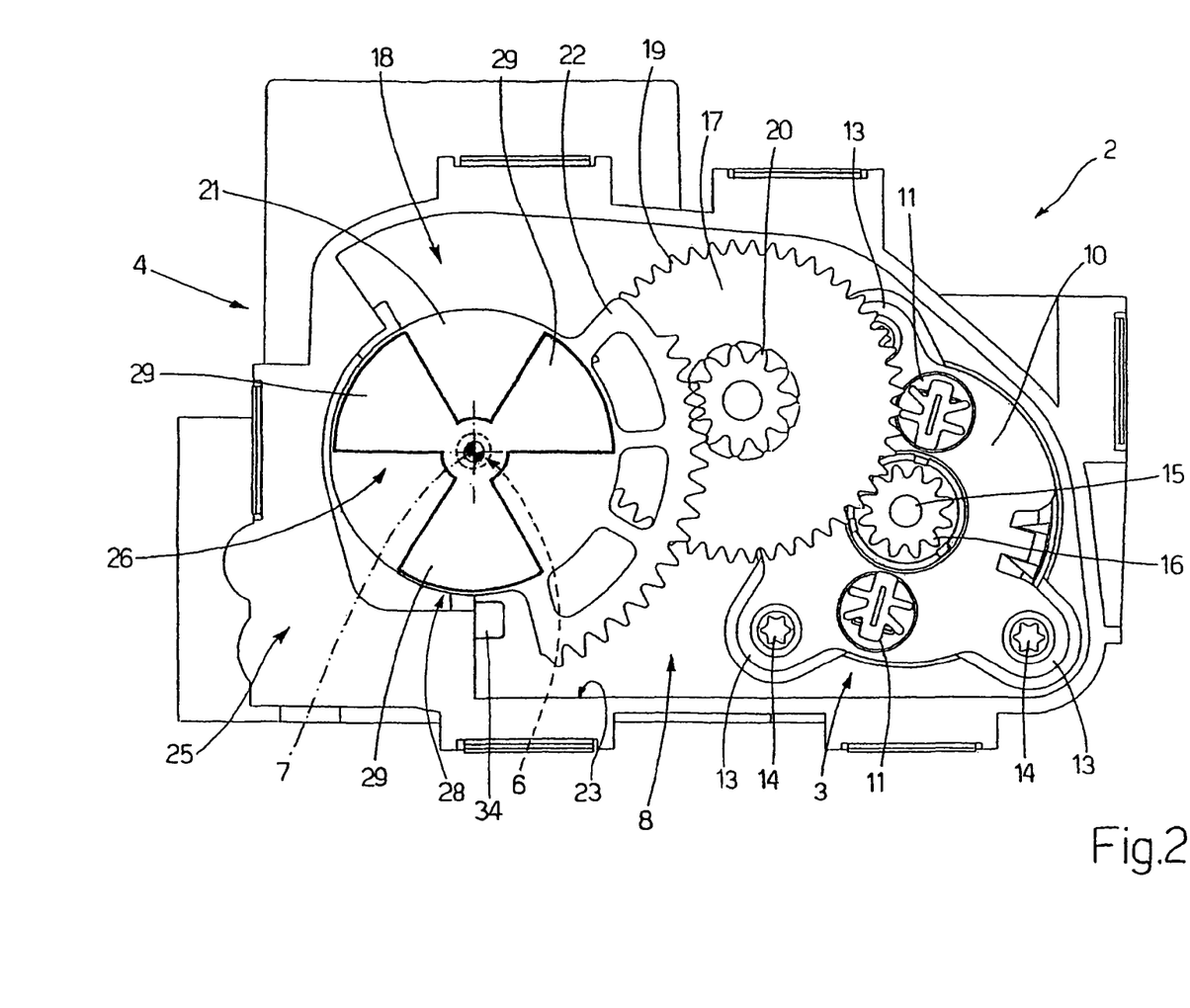
FIG. 2 is a front view with parts removed for clarity of the butterfly valve in FIG. 1.

As shown in FIG. 2, the actuator device includes the electric motor 3 which is coupled to the rotating shaft 6 by means of a gear transmission 8, a return spring (not shown and coupled to the shaft 6) adapted to rotate the butterfly plate 5 towards the closing position, and possibly a contrast spring (not shown and coupled to the rotating shaft 6) adapted to rotate the butterfly plate 5 towards a partial opening position or limp-home position against the bias of the return spring. In particular, the contrast spring that rotates the butterfly plate 5 towards the limp-home position against the bias of the return spring is present if the butterfly valve 1 is intended to be used in an internal combustion engine operating according to the Otto controlled-ignition cycle of the mixture (thus fed with gasoline or the like), whereas the contrast spring is absent if the butterfly valve 1 is intended to be used in an internal combustion engine operating according to the Diesel spontaneous-ignition cycle of the mixture (thus fed with diesel fuel or the like).

The electric motor 3 features a cylindrical body, which is arranged in a tubular housing 9 (shown in FIG. 1) arranged by the side of the feeding pipe 4 and is maintained in a determined position within the tubular housing 9 by a metallic plate 10; the metallic plate 10 features a pair of electric female connectors 11, which are electrically connected to the electric motor 3 and are adapted to be engaged by a pair of corresponding electric male connectors 12 (shown in FIG. 1). In order to ensure the correct fastening of the electric motor 3 to the valve body 2, the plate 10 features three perforated radial protrusions 13, through which the corresponding fastening screws 14 to the valve body 2 are inserted.

The electric motor 3 features a shaft 15 ending with a toothed wheel 16, which is mechanically connected to the rotating shaft 6 by means of an idle toothed wheel 17 interposed between the toothed wheel 16 and an end gear 18 keyed onto the rotating shaft 6. The toothed wheel 17 features a first series of teeth 19 coupled to the toothed wheel 16 and a second series of teeth 20 coupled to the end gear 18; the diameter of the first series of teeth 19 is different from the diameter of the second series of teeth 20, thus the toothed wheel 17 determines a non-unitary transmission ratio. The end gear 18 is defined by a solid cylindrical central body 21 keyed onto the rotating shaft 6 and provided with a circular crown portion 22 provided with a series of teeth coupled to the toothed wheel 17.

The gear transmission 8 and the plate 10 are arranged in a chamber 23 of the valve body 2, which is closed by a removable lid 24 (shown in FIG. 1).

As shown in FIGS. 1 and 2, the butterfly valve 1 includes an inductive position sensor 25 of the contact-less type, which is coupled to the rotating shaft 6 and is adapted to detect the angular position of the rotating shaft 6 and, thus, of the butterfly plate 5 to allow a control in feedback of the position of the butterfly plate 5 itself. The position sensor 25 is of the type described in U.S. Pat. No. 6,236,199B1 and includes a rotor 26 integral with the rotating shaft 6 and a stator 27 supported by the lid 24 and arranged facing the rotor 26 in use; the rotor 26 is defined by a flat metallic loop 28, which is closed in short-circuit, features a series of lobes 29, and is incorporated in the central cylindrical body 21 of the end gear 18. The stator 27 of the position sensor 25 includes a support base 30, which is connected to an internal wall 31 of the lid 24 by means of four plastic rivets 32.

As shown in FIG. 1, the lid 24 is provided with a female electric connector 33, which comprises a series of electric contacts (not shown in detail): two electric contacts are connected to the male electric connectors 12 adapted to supply the electric motor 3, while the other electric contacts are connected to the stator 27 of the position sensor 25; when the lid 24 is arranged in contact with the valve body 2 to close the chamber 23, the female electric connector 33 is arranged over the tubular housing 9 of the electric motor 3.

As shown in FIG. 2, a fixed catch element 34 is provided, which consists of a protrusion of the valve body 2 projecting within the chamber 23 and limits the rotation of the rotating shaft 6 thus forming a mechanical end stroke defining the maximum closing position that may physically be reached by the rotating shaft 6 itself (and therefore by the butterfly plate 5). In particular, the catch element 34 is arranged so as to interfere with the path of the circular crown portion 22 which is provided with a series of teeth coupled to the toothed wheel 17 and is angularly integral with the rotating shaft 6. The function of the catch element 34 is to mechanically prevent the butterfly plate 5 from jamming by interference against the feeding pipe 4, which situation could cause the deformation of the butterfly plate 5, the deformation of the feeding pipe 2 or, even worse, the sticking of the butterfly valve 1.

Figure 3:
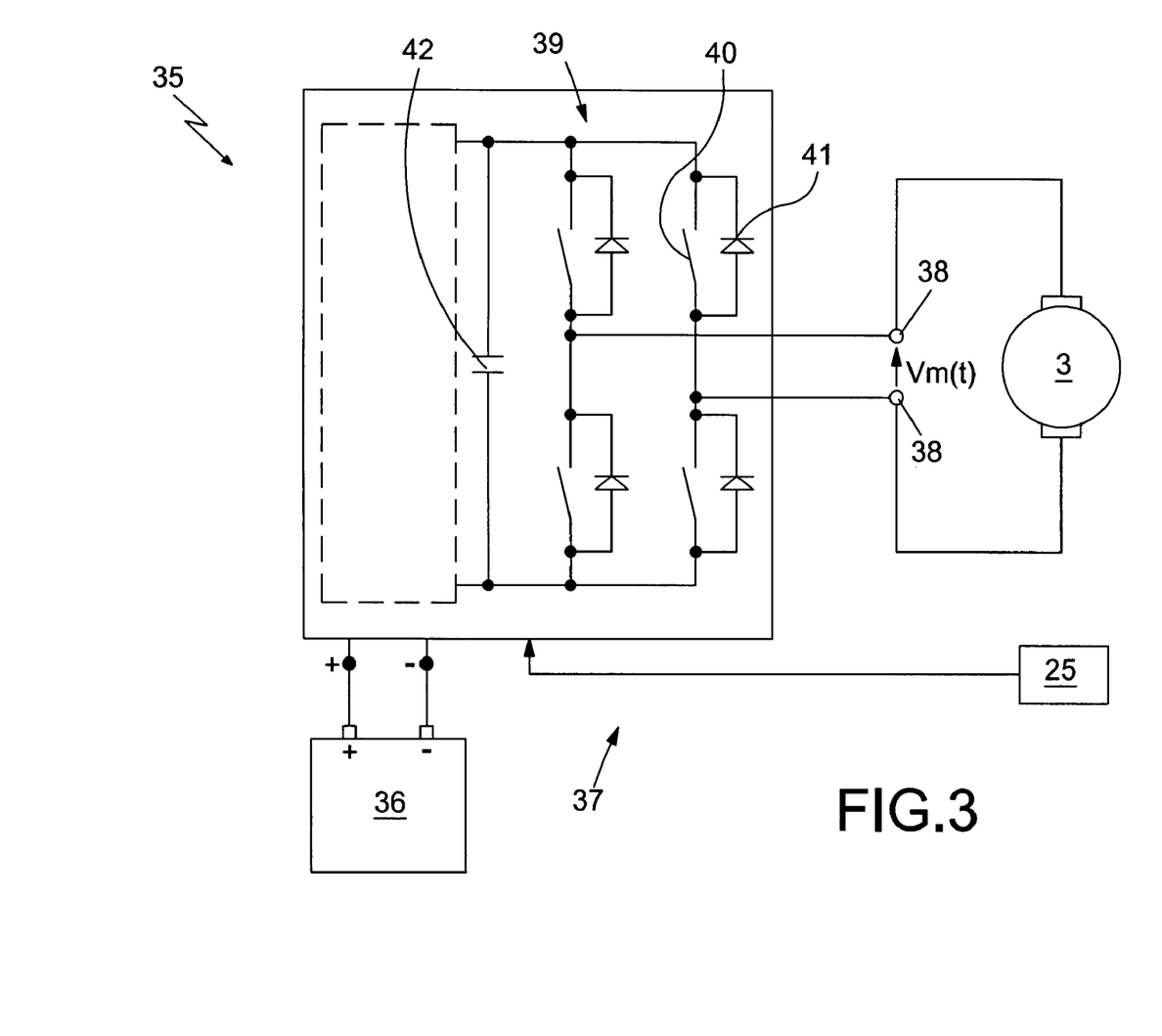
FIG. 3 is a diagrammatic view of an electronic control unit that controls the electric motor of the butterfly valve in FIG. 1.

As shown in FIG. 3, the butterfly valve 1 is controlled by an electronic control unit 35, which is integrated in a PCB (Printed Circuit Board) and controls in feedback the angular position of the butterfly plate 15 by using the signal provided by the position sensor 25. The electronic control unit 35 is fed by a battery 36 of the internal combustion engine and is provided with an electric drive 37 that adjusts the average voltage $Vm(t)$ applied to the electric motor 3 by means of the PWM (Pulse Width Modulation) technique that implies the application of a variable electric voltage $Vm(t)$ having a square waveform to the clamps 38 of the electric motor, and the adjustment of the average value of the electric voltage $Vm(t)$ by varying the amplitude of the square pulses of electric voltage. In other words, an electric voltage $Vm(t)$ varying in time is applied to the clamps 38 of the electric motor 3, the electric voltage $Vm(t)$ displaying a square waveform and consisting of a sequence of pulses having a uniform wave period and a variable amplitude; to adjust the average value of the electric voltage $Vm(t)$ applied to the clamps 38 of the electric motor 3 the amplitude of the pulses of the electric voltage $Vm(t)$ is varied.

In order to apply both a positive voltage $Vm(t)$ and a negative voltage $Vm(t)$ (required to obtain high precision and speed in the handling of the butterfly plate 15) to the clamps 38 of the electric motor 3, the electric drive 37 includes an H-bridge 39 that allows the inversion of the output voltage. In particular, the H-bridge 39 includes four transistors 40, each of which is provided with a free-wheel diode 41 of its own. Upstream of the H-bridge 39 a capacitor 42 is connected, which serves to uniform the voltage absorbed by the electric drive 37 and to allow the circulation of electric current absorbed by the electric motor 3 when a negative voltage $Vm(t)$ is applied to the clamps 38 of the electric motor 3; indeed, the electronic circuit of the electronic control unit 35 arranged upstream of the H-bridge 39 normally only allows the one-directional circulation of the electric current towards the H-bridge 39.

Figure 4A:
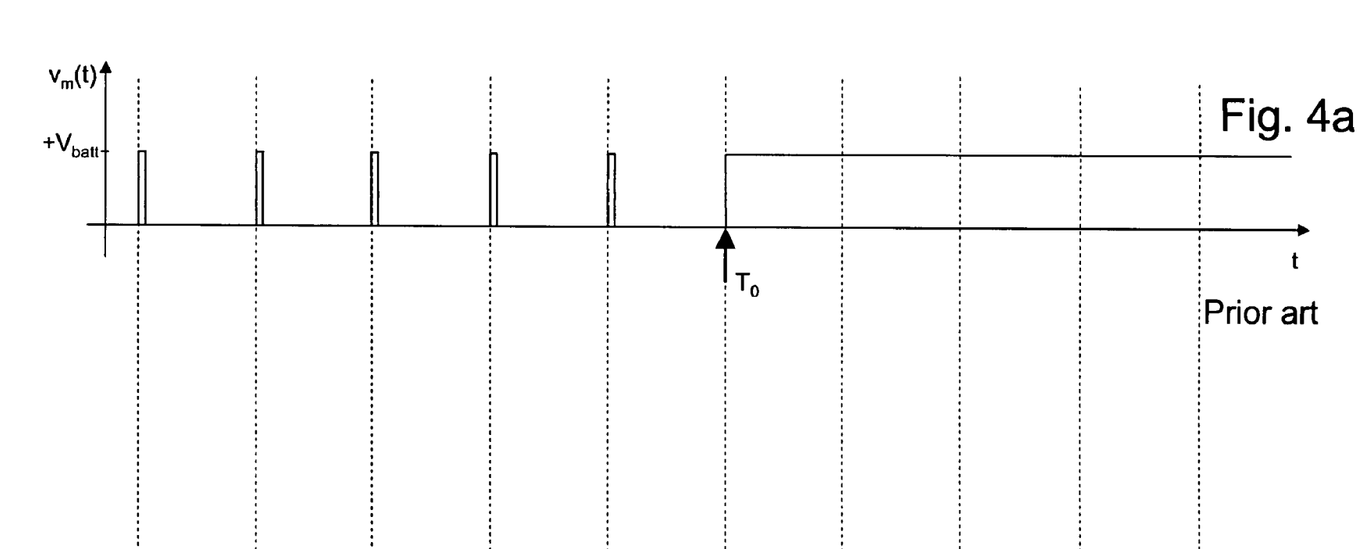
FIGS. 4a, 4b and 5a, 5b show some time courses of the instant voltage applied to the electric motor of the butterfly valve of FIG. 1 according to a standard control method of the present invention.
Figure 5A:
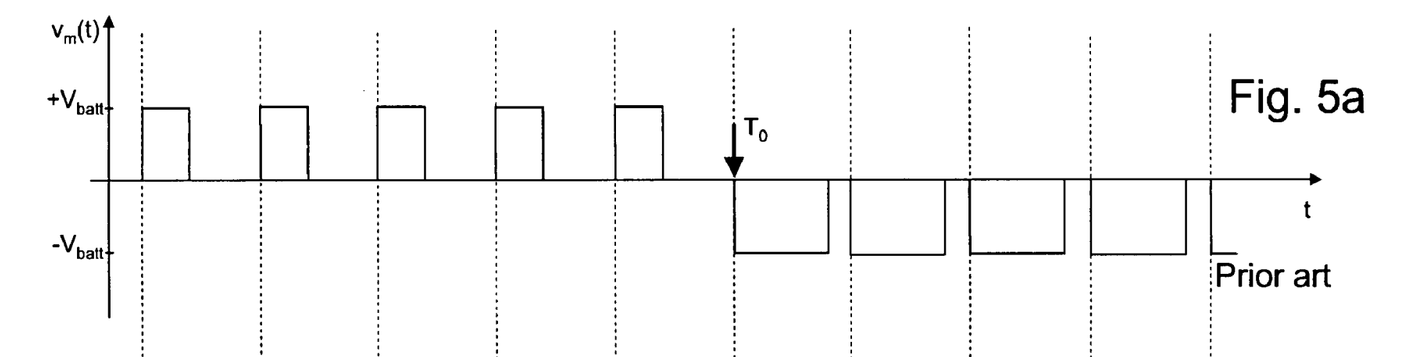

The graph of FIG. 4a (indicated by the term "Prior art") shows the trend of the instant electric voltage $Vm(t)$ applied to the clamps 38 of the electric motor 3 according to a standard PWM technique that varies the instant electric voltage $Vm(t)$ between zero and a positive value equivalent in absolute value to the battery voltage $(+V_{batt})$; in case the amplitude of the pulses varies at the time $T_0$, the overall required amplitude variation (which may be positive in order to increase the amplitude of the pulses or negative in order to reduce the amplitude of the pulses) is entirely applied to the first pulse following the time $T_0$ (that is following the request for variation). The graph of FIG. 5a (indicated by the term "Prior art") shows another trend of the instant electric voltage Vm(t) applied to the clamps 38 of the electric motor 3 according to a standard PWM technique which varies the instant electric voltage Vm(t) between a negative value equivalent in absolute value to the battery voltage ($-V_{batt}$) and a positive value equivalent in absolute value to the battery voltage ($+V_{batt}$); in case the amplitude of the pulses varies at the time $T_0$, which also implies the inversion of the electric voltage Vm(t), the overall required amplitude variation and therefore the subsequent inversion of the electric voltage Vm(t) is entirely applied to the first pulse following the time $T_0$ (that is following the request for variation).

It has been observed that by operating according to the standard PWM technique described above and shown in FIGS. 4a and 5a, very fast electric current transistors are generated, which determine very high electric current variation speeds. Such a fast variation of the electric current absorbed by the electric motor 3 normally has an effect on the capacitor 42, in which an extremely fast redistribution of electric charges occurs, which may easily determine a deterioration of the dielectric of the capacitor 42 itself; accordingly, the cyclic repetition of the fast variations of the electric current absorbed by the electric motor 3 may lead to the destruction of the dielectric of the capacitor 42 (i.e. to the destruction of the capacitor 42) in a relatively short time, unless the capacitor 42 itself is greatly oversized.

Figure 4B:
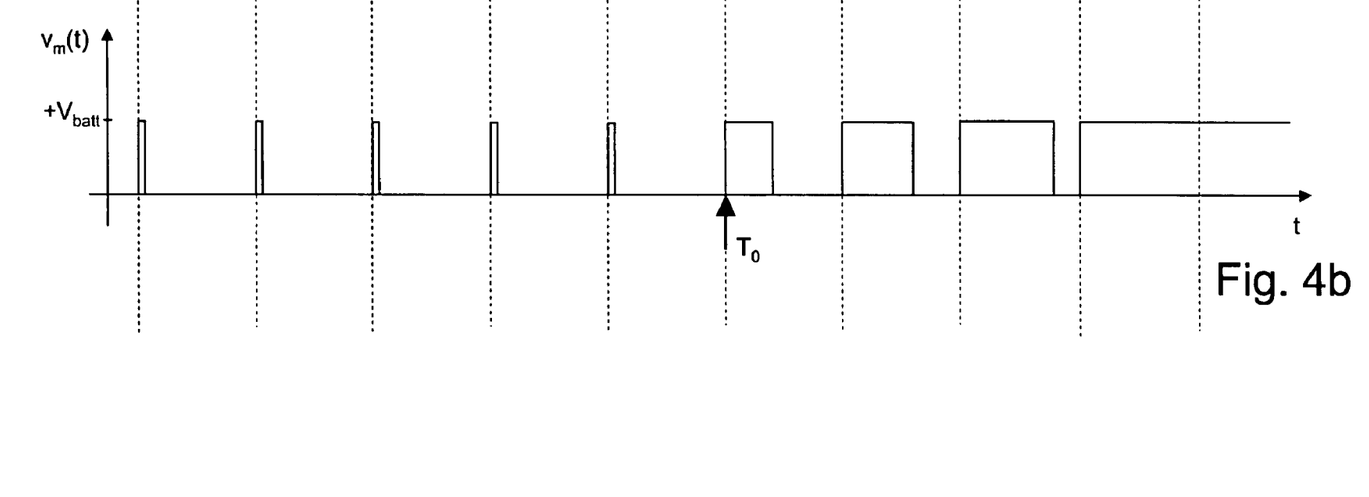

The graph of FIG. 4b shows the trend of the instant electric voltage Vm(t) applied to the clamps 38 of the electric motor 3 according to the PWM technique of the present invention; in case the amplitude of the pulses varies at the time $T_0$, the overall required amplitude variation (which may be positive to increase the amplitude of the pulses or negative to reduce the amplitude of the pulses) is determined, the overall required amplitude variation is subdivided in a determined number of partial variations (which may be either positive or negative), the overall algebraic sum of which is equivalent to the overall required amplitude variation, and therefore the amplitude of the pulses of the electric voltage Vm(t) is gradually varied by applying in a sequence a respective partial variation to each pulse, such that the difference between the amplitude of a pulse and the amplitude of a following pulse is equivalent to the corresponding partial variation.

Taking as an example what is shown in FIG. 4b, the overall variation, which implies the increase of the amplitude of the pulses from 20% to 100%, is determined at the time $T_0$; therefore the overall required amplitude variation is equivalent to 80% and is subdivided in four partial variations, each of which implies an amplitude increase of 20%. Therefore, the first pulse following the time $T_0$ displays an amplitude of 40% (the 20% amplitude used previously increased by a first partial variation of 20%), the second pulse following the time $T_0$ displays a 60% amplitude, the third pulse following the time $T_0$ displays an 80% amplitude and finally the fourth pulse following the time $T_0$ displays a 100% amplitude.

Figure 5B:
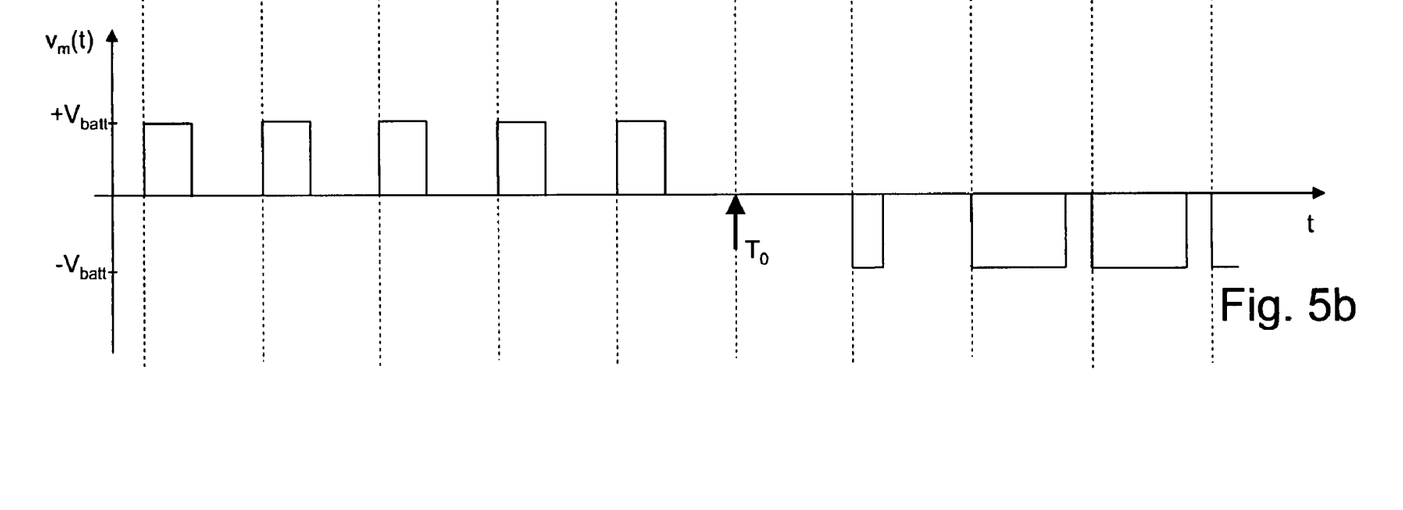

The example in FIG. 5b shows that the inversion of the electric voltage Vm(t) applied to the clamps 38 of the electric motor 3 is also required at the time $T_0$; in this manner it may be verified whether the variation of the amplitude of the pulses also implies the inversion of the electric voltage Vm(t) and, if the variation of the amplitude of the pulses also implies the inversion of the electric voltage Vm(t), a negative value is assigned to the first partial variation so as to cancel the amplitude of the first pulse after the inversion of the electric voltage Vm(t). Such a mode is clearly shown in FIG. 5b in which it may be noted that the first pulse after the inversion of the electric voltage Vm(t) at the time $T_0$ displays a null amplitude.

Accordingly, if the variation of the amplitude of the pulses also implies the inversion of the electric voltage Vm(t), the first partial variation always displays a negative value (as it must cancel the amplitude of the first pulse after the inversion of the electric voltage Vm(t)) whereas the second and the third partial variations always display a positive value (as in the first pulse after the inversion of the electric voltage Vm(t) the amplitude is null and therefore must always be increased).

The example shown in FIG. 4b shows that the partial variations display the same amplitude, i.e. the overall required amplitude variation is subdivided in equivalent parts. The example shown in FIG. 5b shows that the partial variations display different amplitudes thereamong; indeed, the first partial variation is negative, the second partial variation is positive and the third partial variation is positive although it is different with respect to the second partial variation. In order to determine the optimal distribution of the partial variations, a mathematical model of the electric system and/or of the experimental tests may be used to seek the distribution of the partial variations allowing to minimise the stresses onto the capacitor 42. By way of example, the partial variations could display different and gradually increasing amplitudes thereamong (i.e. the last partial variations are higher in absolute value than the first partial variations) or decreasing (i.e. the last partial variations are lower in absolute value than the first partial variations).

Normally, the number of partial variations is in the range between 3 and 6; in particular, 3 partial variations are preferably used (as shown in FIG. 5b) if the variation of the amplitude of the pulses also implies the inversion of the electric voltage Vm(t). On the other hand, if the variation of the amplitude of the pulses does not imply the inversion of the electric voltage Vm(t), the number of partial variations is preferably equivalent to the ratio between a frequency of the pulses of the electric voltage Vm(t) and an updating frequency of the average value of the electric voltage Vm(t); in this case the frequency of the pulses of the electric voltage Vm(t) is equivalent to 1 KHz (which represents the best compromise between the requirement to limit the electromagnetic emissions and the requirement to accurately control the electric voltage Vm(t) value applied to the clamps 38 of the electric motor 3), whereas the updating frequency of the average value of the electric voltage Vm(t) (i.e. the frequency by which the electronic control unit 35 updates the average value of the electric voltage Vm(t) and therefore outputs the requests for the variation of the amplitude of the pulses) is normally equivalent to 200 Hz or to 250 Hz. Accordingly, if the variation of the amplitude of the pulses does not imply the inversion of the electric voltage Vm(t), the number of partial variations is normally equivalent to 4 (as shown in FIG. 4b) or to 5.

The control method employing the above described PWM technique has several advantages, as it is simple and cost-effective to implement as it requires no hardware modification, it allows to considerably reduce the electrical stresses onto the capacitor 42 arranged upstream of the H-bridge 39, and does not imply any negative effect on the dynamics of the electric motor 3. Indeed, theoretical simulations and experimental tests have highlighted that by using the above described PWM technique the speed of the variation of the electric current absorbed by the electric motor 3 is considerably limited and therefore the integrity of the capacitor 42 is maintained. Furthermore, the mechanical inertia of the electric motor 3 being relatively high, the response delay (on the order of 1-3 ms) introduced by the gradual variation of the amplitude of the pulses of the electric voltage Vm(t) is totally irrelevant and therefore negligible. In other terms, the response delays of the mechanical part of the electric motor 3 are on the order of a few tens of milliseconds and therefore a response delay of a few milliseconds (i.e. on a smaller order of magnitude) has no appreciable impact on the overall dynamics of the electric motor 3.

In the embodiment shown in the accompanying figures, the butterfly valve 1 adjusts the flow rate of the air taken in by the internal combustion engine which may run according to the Otto controlled-ignition cycle of the mixture (and thus fed with gasoline or the like) or may run according to the Diesel spontaneous-ignition cycle of the mixture (and thus be fed with diesel fuel or the like). Obviously, in other applications, the butterfly valve 1 may adjust an air flow rate other than the air taken in by the internal combustion engine, e.g. the flow rate of recirculated air in an EGR circuit.

In further applications, the above described control method could be used to control an electric motor which is not included in a butterfly valve.

The invention claimed is:

1. A method for controlling an electric motor by using the PWM technique; the control method comprises the steps of:
    applying to the clamps of the electric motor an electric voltage (Vm(t)) varying in time, which displays a square waveform and consists of a sequence of pulses having a uniform wave period and a variable width;
    adjusting the average value of the electric voltage (Vm(t)) applied to the clamps of the electric motor by varying the width of the pulses of the electric voltage (Vm(t));
    determining, in the case of a variation of the width of the pulses, the overall required width variation;
    subdividing the overall required width variation in a determined number of partial variations, the overall sum of which is equivalent to the overall required width variation; and
    gradually varying the width of the pulses of the electric voltage (Vm(t)) by applying in a sequence to each pulse a corresponding partial variation so that the difference between the width of a pulse and the width of a following pulse is equivalent to the corresponding partial variation;
    verifying whether the variation of the width of the pulses also implies the inversion of the electric voltage (Vm(t)); and
    assigning a negative value to the first partial variation, if the variation of the width of the pulses also implies the inversion of the electric voltage (Vm(t)), so as to cancel the width of at least the first pulse after the inversion of the electric voltage (Vm(t)).

2. A control method according to claim 1, wherein the partial variations display the same width.

3. A control method according to claim 1, wherein the partial variations display different width there among.

4. A control method according to claim 3, wherein the partial variations display different and gradually increasing widths there among.

5. A control method according to claim 3, wherein the partial variations display different and gradually decreasing widths there among.

6. A control method according to claim 1, wherein, if the variation of the width of the pulses does not imply the inversion of the electric voltage (Vm(t)), the number of partial variations is equivalent to the ratio between the frequency of the pulses of the electric voltage (Vm(t)) and an updating frequency of the average value of the electric voltage (Vm(t)).

7. A control method according to claim 1, wherein, if the variation of the width of the pulses does not imply the inversion of the electric voltage (Vm(t)), the number of partial variations is in the range between 3 and 6.

8. A control method according to claim 1, wherein the frequency of the pulses of the electric voltage (Vm(t)) is equivalent to 1 KHz.

9. A control method according to claim 1, wherein, if the variation of the width of the pulses also implies the inversion of the electric voltage (Vm(t)), the number of partial variations is 3.

10. A control method according to claim 9, wherein, if the variation of the width of the pulses also implies the inversion of the electric voltage (Vm(t)), the first partial variation always displays a negative value whereas the second and the third partial variations always display a positive value.

11. A control method according to claim 1 and comprising the step of using an electric drive (37) provided with an H-bridge (39) to feed the electric voltage (Vm(t)) to the clamps (38) of the electric motor (3).

12. A control method according to claim 1, wherein the electric motor is mechanically connected to a butterfly plate of a butterfly valve for an internal combustion motor.

13. A control method according to claim 12, wherein the butterfly valve includes: a valve body; a tubular feeding pipe defined in the valve body; a rotating shaft which rotates about a rotation axis; a butterfly plate, which is arranged within the feeding pipe and is keyed to the rotating shaft to rotate between an opening position and a closing position of the feeding pipe; a position sensor for detecting the angular position of the rotating shaft; and an actuator device which is connected to the rotating shaft to rotate the rotating shaft itself and comprises the electric motor.

14. A method for controlling an electric motor by using the PWM technique; the control method comprises the steps of:
    applying to the clamps of the electric motor an electric voltage (Vm(t)) varying in time, which displays a square waveform and consists of a sequence of pulses having a uniform wave period and a variable width;
    adjusting the average value of the electric voltage (Vm(t)) applied to the clamps of the electric motor by varying the width of the pulses of the electric voltage (Vm(t));
    determining, in the case of a variation of the width of the pulses, the overall required width variation;
    subdividing the overall required width variation in a determined number of partial variations, the overall sum of which is equivalent to the overall required width variation; and
    gradually varying the width of the pulses of the electric voltage (Vm(t)) by applying in a sequence to each pulse a corresponding partial variation so that the difference between the width of a pulse and the width of a following pulse is equivalent to the corresponding partial variation;
    wherein the electric motor is mechanically connected to a butterfly plate of a butterfly valve for an internal combustion motor; and
    wherein the butterfly valve includes: a valve body; a tubular feeding pipe defined in the valve body; a rotating shaft which rotates about a rotation axis; a butterfly plate, which is arranged within the feeding pipe and is keyed to the rotating shaft to rotate between an opening position and a closing position of the feeding pipe; a position sensor for detecting the angular position of the rotating shaft; and an actuator device which is connected to the rotating shaft to rotate the rotating shaft itself and comprises the electric motor.

15. A control method according to claim 14, wherein the partial variations display the same width.

16. A control method according to claim 14, wherein the partial variations display different width there among.

17. A control method according to claim 16, wherein the partial variations display different and gradually increasing widths there among.

18. A control method according to claim 16, wherein the partial variations display different and gradually decreasing widths there among.

19. A control method according to claim 14, wherein, if the variation of the width of the pulses does not imply the inversion of the electric voltage (Vm(t)), the number of partial variations is equivalent to the ratio between the frequency of the pulses of the electric voltage (Vm(t)) and an updating frequency of the average value of the electric voltage (Vm(t)).

20. A control method according to claim 14, wherein, if the variation of the width of the pulses does not imply the inversion of the electric voltage (Vm(t)), the number of partial variations is in the range between 3 and 6.

21. A control method according to claim 14, wherein the frequency of the pulses of the electric voltage (Vm(t)) is equivalent to 1 KHz.

* * * * *